2,886,593

ORGANIC SULFUR HALIDES, DERIVATIVES THEREOF, AND PREPARATION OF SUCH HALIDES AND DERIVATIVES

Rector P. Louthan, Bartlesville, Okla., and Carl W. Kruse, Urbana, Ill., assignors to Phillips Petroleum Company, a corporation of Delaware No Drawing. Application October 25, 1955
Serial No. 542,781

21 Claims. (Cl. 260—543)

This invention relates to the preparation of organic sulfur halides and derivatives thereof. In one aspect this invention relates to organic sulfur halides as new compounds. In another aspect this invention relates to derivatives of organic sulfur halides as new compounds. In another aspect this invention relates to preparation of organic sulfur halides by reacting selected mercaptans and/or organic sulfides with an inorganic sulfur halide. In one aspect this invention relates to preparation of derivatives of selected organic sulfur halides by reacting a mercaptan and/or an organic sulfide with an inorganic sulfur halide under conditions for forming a corresponding organic sulfur halide and then reacting the resulting reaction mixture with a reactant which is reactive with an organic sulfenyl halide such as a xanthate, an amine, a thiocarbamate, a thiocarbonate, and a cyanide, to form the said derivative.

Various methods have been employed in the art in the production of organic sulfur halides. As disclosed and claimed in the copending application of C. M. Himel, Serial No. 387,386, filed October 21, 1953, alkyl mercaptans and/or disulfides are reacted with halogen to produce corresponding alkyl sulfenyl and alkyl thiosulfenyl halides, the latter only as the tertiary alkyl compound. Such halides have been employed in the manufacture of various derivatives, such as thiosulfenamides, as disclosed and claimed in U.S. Patent 2,520,401 of Himel and Edmonds, issued August 29, 1950, of alkyl sulfenyl trithiocarbonates, as disclosed and claimed in U.S. Patent 2,574,457 of P. M. Arnold, issued November 13, 1951, of alkyl sulfenyl thiocyanates as disclosed and claimed in U.S. Patent 2,572,567 of Himel and Edmonds, issued October 23, 1951, and of organic thiosulfenyl dithiocarbamates as disclosed and claimed in U.S. Patents 2,572,845 and 2,690,440 of Himel and Edmonds, issued October 30, 1951, and September 28, 1954, respectively. Thiosulfenamide derivatives have also been prepared by reacting an amine with mercaptan and/or disulfide and halogen, in accordance with process as disclosed and claimed in the copending application of C. M. Himel, Serial No. 395,139, filed August 25, 1954, now U.S. Patent No. 2,807,615.

We have now discovered that organic sulfur halides, of the generic formula $RS_nX$, which contain a number of sulfur atoms over a broad range can be prepared by reacting an organic sulfide with an inorganic sulfur halide and that certain of such halides can be prepared by reacting a mercaptan with such an inorganic sulfur halide. We have further discovered that, when forming halides as above described, not only are tertiary alkyl thiosulfenyl halides produced but also the corresponding primary and secondary alkyl compounds can be formed.

An object of this invention is to provide a method for the preparation of organic sulfur halides. Another object is to provide a method for the preparation of derivatives of selected organic sulfur halides. Another object is to provide new organic sulfur halides, and derivatives thereof. Another object is to provide a modus operandi for reacting mercaptans with inorganic sulfur halides whereby organic sulfenyl halides are obtained in high yield. Another object is to provide organic sulfenyl halides containing a number of sulfur atoms larger than that heretofore obtained. Still another object is to provide for the preparation of primary, secondary, and tertiary alkyl thiosulfenyl halides. Other aspects, objects and advantages of this invention are apparent from a perusal of this disclosure, and the appended claims.

In accordance with this invention a process is provided which comprises reacting at least one of a mercaptan $RSH$, and a sulfide, $RS_mR$, with a sulfur halide of the formula $S_yX_2$ to form a halide, $RS_nX$, and when reacting a mercaptan, maintaining a mol ratio of the said mercaptan to the said sulfur halide below 1:1, wherein in the abovesaid formulas, each R is a radical of the group of saturated acyclic, saturated alicyclic, and aryl, $m$ is an integer of the group of 1 to 6, $y$ is an integer of the group of 1 and 2, $n$ is an integer equal to at least 1, and X is a halogen; the invention is accordance with another concept providing process comprising reacting resulting $RS_nX$-containing reaction mixture with a reactant compound reactive with such $RS_nX$ compound as above described, to produce a derivative thereof, exemplary of which reactive compounds are primary and secondary amines and metal or ammonium salts of xanthates, dithiocarbamates, cyanides, and trithiocarbonates.

Still in accordance with this invention, there are provided as new compounds, organic halides characterized by the formula $RS_nX$, wherein R is one of the group of saturated acyclic, saturated alicyclic, and aryl radicals, $n$ is an integer of from 3–7, and X is a halogen; the invention in accordance with still another concept providing for new compositions of the formula $(RS_n)_aY$, wherein R is as above described, Y is a radical of the group of

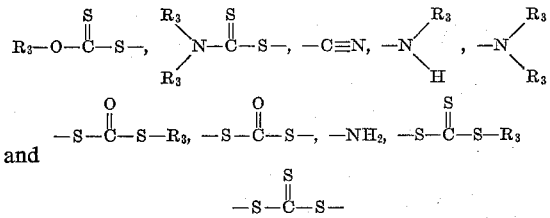

and $a$ is an integer of the group of 1 and 2. $R_3$ is a non-reactive hydrocarbon or substituted hydrocarbon radical, as for example methyl, ethyl, tert-butyl, dodecyl, cyclohexyl, methylcyclohexyl, benzyl, 2-phenylethyl, methoxyphenyl, 2-nitropropyl, and 4-cyclohexylbutyl.

The following equation exemplifies reactions involved in the process of this invention $$R_1-S_m-R_2 + S_yX_2 \rightarrow R_1-S_n-X + R_2S_zX$$

In the formulas in the foregoing equation, $R_1$ is a radical of the group of a saturated acyclic, a saturated alicyclic, and an aryl, preferably containing from 1 to 20 carbon atoms, $R_2$ is a radical of the group of hydrogen, a saturated acyclic, a saturated alicyclic, and an aryl, also containing preferably from 1 to 20 carbon atoms, X is a halogen, preferably of the group of chlorine and bromine, $y$ is an integer of the group of 1 and 2, $m$ is an integer of the group of 1 to 6, and $n$ is an integer of the group of 1 to 7. When $R_2$ is hydrogen, $m$ is 1, $z$ is zero, and $n$ is equal to the sum of $m$ and $y$. When $R_2$ is a saturated acyclic, a saturated alicyclic or an aryl hydrocarbon radical, $m$ is an integer of from 1 to 6, $y$ is 1, and $n$ can be from 1 to 7, inclusive, $z$ being equal to $(m+1)-n$. $R_2$ and $R_1$ may be alike or different. The following equations illustrate reactions that take place when an $RS_nX$-containing reaction mixture, formed in accordance with this invention, is reacted with a compound reactive with $RS_nX$ compounds (the said $RS_nX$ being defined hereinabove) to form a derivative as described.

(1) 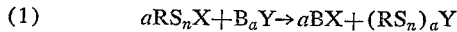

$$aRS_nX + B_aY \rightarrow aBX + (RS_n)_aY$$

wherein $a$ is an integer of the group of 1 and 2, B is a radical of the group of ammonium and a metal, preferably ammonium or an alkali metal, Y is an organic radical such as of the group of xanthate, dithiocarbamate, trithiocarbonate, and cyano.

(2) 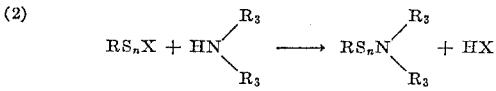

$$RS_nX + HN\begin{matrix}R_3\\R_3\end{matrix} \longrightarrow RS_nN\begin{matrix}R_3\\R_3\end{matrix} + HX$$

wherein $R_3$ is hydrogen, non-reactive hydrocarbon, or non-reactive substituted hydrocarbon radical.

Exemplary of compounds of the formula, $RS_nX$, produced in accordance with this invention, as illustrated with reference to the above equations, are methyl sulfenyl bromide, n-propyl thiosulfenyl chloride, isopropyl thiosulfenyl chloride, tert-butyl-thiosulfenyl chloride, tert-octyl thiosulfenyl chloride, n-decyl dithiosulfenyl bromide, 4-n-octyl-phenyl dithiosulfenyl chloride, n-eicosyl trithiosulfenyl chloride, cyclohexyl tetrathiosulfenyl bromide, tert-dodecyl pentathiosulfenyl chloride, n-butyl sulfenyl chloride, and sec-amyl hexathiosulfenyl chloride.

Exemplary of compounds reactive with $RS_nX$ compound defined above, i.e. of which the formula $B_aY$ is representative are sodium phenyl xanthate, potassium ethyl xanthate, methylamine, diethylamine, morpholine, piperidine, sodium diethyl dithiocarbamate, potassium dimethyl dithiocarbamate, sodium trithiocarbonate, lithium dithiocarbonate, and magnesium cyanide.

Exemplary of derivative products, $(RS_n)_aY$, referred to hereinabove are O-phenyl-tert-butylthiosulfenyl xanthate, O-ethyl-n-propyl-dithiosulfenyl xanthate, N,N-di-(ethyl sulfenyl) methylamine, N,N-diethyl phenylthiosulfenamide, N-ethyldithiosulfenyl morpholine, N-tert-dodecyl pentathiosulfenyl piperidine, ethylthiosulfenyl dithiocarbonate, S-tert-butyl-S'-n-propyl trithiosulfenyl trithiocarbonate, and n-octyl tetrathiosulfenylcyanide.

Although it is within the scope of this invention to employ any sulfur mono- or dihalide, sulfur mono- and dichlorides and mono- and dibromides are preferred.

Illustrative of mercaptan reactants that can be employed in carrying out the process of this invention are methyl mercaptan, isopropyl mercaptan, n-propyl mercaptan, tert-butyl mercaptan, cyclohexyl mercaptan, tert-octyl mercaptan, 2,4,5-trimethylphenyl mercaptan, n-eicosyl mercaptan, 2,2-di-t-butyl-4-n-hexyl-cyclohexyl mercaptan, and tert-dodecyl mercaptan, and exemplary of sulfide reactants that can be so employed are dimethyl disulfide, di-tert-butyl trisulfide, di-cyclohexyl tetrasulfide, cyclohexyl tert-butyl pentasulfide, n-eicosyl phenyl hexasulfide, n-propyl-tert-dodecyl tetrasulfide, diethyl hexasulfide, and dihexyl monosulfide.

The mercaptan and/or sulfide-inorganic sulfur halide reaction is carried out at a temperature preferably in the range of about −75 to 200° C. and is generally carried out in liquid phase. Any pressure sufficiently high to insure maintaining reactants and product in liquid phase is suitable.

As set forth hereinabove, when reacting a mercaptan with the inorganic sulfur halide reactant, the sulfur halide concentration is maintained at all times in the reaction zone, in stoichiometric excess of the mercaptan. We have found that this can be advantageously carried out by introducing the mercaptan reactant slowly into the main body of the sulfur halide reactant. However, when reacting a sulfide with the sulfur halide reactant, the reactants can be admixed and reacted in any desired manner.

The reaction may be carried out either in the presence or absence of a solvent, which is chemically inert under all reaction conditions. The $RS_nX$-forming reaction is exothermic and may be advantageously controlled by employing a relatively low-boiling solvent which will be vaporized by the heat of reaction, and condensing the solvent vapors for return to the liquid phase in which the reaction is carried out. However, we have found that the use of amounts of solvent exceeding about 0.5 liter for each mol of sulfur halide reactant will result in a tendency to decrease product yield. Exemplary of solvents which may be used are saturated aliphatic or aromatic normally liquid hydrocarbons containing from about 5-9 carbon atoms in the molecule, such as n-pentane, heptane, hexanes, benzene, and toluene, and non-hydrocarbon solvents, as for example, carbon tetrachloride, diethyl ether, dioxane, and tertachloroethane.

Any suitable method or means for effecting contact of reactants can be utilized, as for example, batch or continuous flow-type reactors, or mixing-tee devices such as those employed in effecting reaction of halogens with mercaptans and/or disulfides, as disclosed and claimed in the co-pending application of R. P. Louthan, Serial No. 534,889, filed September 16, 1955.

It is a feature of this invention that primary, secondary and tertiary alkyl thiosulfenyl halides can be prepared whereas when reacting mercaptans and/or sulfides with halogen, as described hereinabove to produce corresponding sulfenyl and/or thiosulfenyl halides, the thiosulfenyl halides produced are tertiary alkyl compounds only.

In accordance with a preferred embodiment of this invention, a sulfur monohalide, preferably sulfur monochloride, together with a solvent therefor, as for example n-pentane, is introduced into the reaction zone and maintained therein under reflux, a dry ice-acetone condenser being advantageously employed therefor. The amount of solvent employed is less than 0.5 liter per mol of sulfur halide, preferably in the range of from 0.05 to 0.1 liter.

To the refluxing pentane-sulfur monohalide mixture maintained under agitation conditions is added up to about 1 mol of mercaptan or sulfide reactant, preferably from 0.5 to 0.9 mol thereof, per mol of sulfur halide, as for example tertiary butyl mercaptan or ditertiary butyl trisulfide. When so employing a mercaptan reactant, sulfur halide is present in stoichiometric excess of mercaptan reactant at all times. Further, it is advantageous to add either the mercaptan and/or the sulfide reactant slowly to the refluxing mixture such as at a rate of from about 300 to 600 mols per 100 mols of sulfur halide reactant per hour. In some instances the reactants can be added more rapidly, provided the reaction temperature can be maintained in the desired range. In this manner the temperature of reaction is conveniently controlled at the boiling point of the reaction mixture under the given pressure, the reaction temperature employed in this embodiment being, therefore, generally in the range of from about −75 to 200° C.

Resulting halide, $RS_nX$, so produced, can be recovered from the resulting reaction mixture in any manner desired as discussed hereinabove, such as by crystallization, or preferably by vacuum distillation.

When desired, the $RS_nX$ product so produced can be reacted as a component of the reaction mixture in which it was formed, with a compound reactive with such halides, such as the ammonium or metal salt of xanthic or substituted xanthic acids, primary or secondary amines, the ammonium or metal salts or dithiocarbamic or N-substituted dithiocarbamic acids, ammonium or metal trithiocarbonates, and ammonium or metal cyanides to produce a corresponding derivative of the said halide. In a now preferred embodiment the $RS_nX$-containing reaction mixture is added portion-wise to an aqueous solution of such a derivative-forming reactant as dimethylamine, in, say, from 10 to 40 weight percent aqueous solution, in an amount of the latter to provide substantially equimolar proportions of $RS_nX$ and the added compound to be reacted therewith, although, when desired, a mol ratio of the latter compound to the said $RS_nX$ in the range of about 1:1 to 2:1 can be utilized. The rate of addition of RS$_n$X-containing reaction mixture to the said aqueous reactant solution is advantageously carried out at a rate of about 3 to 6 mols of said halide per mol of said aqueous reactant per hour. The resulting reaction mixture consists of two phases, an oil and an aqueous phase. Solvent initially employed in formation of the RS$_n$X compound is stripped from the oil phase. The resulting stripped oil phase is then subjected to vacuum distillation for recovery of the derivative product formed, which, when reaction product of t-butyl mercaptan and sulfur monohalide is reacted with dimethylamine, the product is chiefly N,N-dimethyl-tert-butyldithiosulfenamide.

The invention is illustrated with reference to the following examples:

EXAMPLE I

The following illustrates preparation of tert-butyldithiosulfenyl chloride (t-C$_4$H$_9$SSSCl) by reacting tertiary butyl mercaptan with sulfur monochloride, in liquid phase.

One hundred thirty-five grams of sulfur monochloride and 750 cc. of n-pentane were charged to a 2-liter, 3-necked flask equipped with a dry ice-acetone condenser, a stirrer, and a dropping funnel. Ninety grams of tert-butyl mercaptan were then added dropwise to the mixture, during which addition the mixture was vigorously agitated. The HCl formed was allowed to escape through the condenser to the atmosphere. The time required for the addition of the t-butyl mercaptan was approximately 20 minutes. The reaction temperature was about 36° C. The yield of tert-butyldithiosulfenyl chloride was determined by reacting the tert-butyldithiosulfenyl chloride product with dimethylamine to form N,N-dimethyl-tert-butyldithiosulfenamide by the following procedure.

The solution containing tert-butyldithiosoulfenyl chloride as prepared above was added dropwise to a vigorously agitated mixture of 190 grams of a 25 weight percent aqueous solution of dimethylamine containing 44 grams of sodium hydroxide, maintained at a temperature of about 27° C. After the addition of the tert-butyldithiosulfenyl chloride, the phases were separated and the oil phase was washed with water. Practically all of the n-pentane was then removed from the oil phase by heating to about 85° C. on a steam bath. The stripped oil phase was then distilled at 0.05 mm. pressure into 10 cc. units. A cut of this distillation was then redistilled at the same conditions and the properties were determined. The boiling point at 0.05 mm. Hg absolute pressure was 50° C. and the refractive index at 20° C. was 1.5415.

A sample of this cut yielded the following analysis:

|  | Calculated | Found [1] |
|---|---|---|
| Carbon | 36.6 | 36.2 |
| Hydrogen | 7.6 | 7.9 |
| Nitrogen | 7.1 | 8.1 |
| Sulfur | 48.7 | 49.3 |

[1] Analysis for each element run individually—total exceeds 100%.

From a plot of the refractive index versus grams overhead for the original distillation, the yield of product was determined.

Yield:
  52 grams bis-dimethylamino) disulfide
  62 grams N,N-dimethyl-tert-butyldithiosulfenamide
  60 grams di-tert-butyl tetrasulfide The foregoing example illustrates that, when reacting a mercaptan with a sulfur halide, at all times maintaining the mol ratio of sulfur halide in excess of that of mercaptan, such as by introducing the mercaptan reactant into a body of the sulfur halide reactant, high yields of corresponding sulfenyl halide product are obtained, whereas, when this modus operandi is not employed, i.e., prior art methods, product obtained is substantially all polysulfide product.

EXAMPLE II

A series of runs were carried out in which various mercaptans were reacted with sulfur dichloride in liquid phase at about 36° C. to form compounds of the general formula RSSCl. The runs were carried out by charging sulfur dichloride and n-pentane to a 2-liter, 3-necked flask, equipped with a dropping funnel, a stirrer, and a dry ice-acetone condenser, and adding the mercaptan dropwise to the sulfur dichloride solution over about a 20-minute period. The compounds of the formula RSSCl were formed but not recovered in these runs but were converted to the corresponding morpholine or dimethylamine derivative by adding the solution of product that resulted from the mercaptan-SCl$_2$ reaction to a mixture of morpholine or dimethylamine, sodium hydroxide and water. After the derivative was formed, the phases were separated and the oil phase was washed with water. After washing, the oil phase was stripped in a simple pot fractionator and then distilled through a packed column. The analyses of the various products and the yields for the various reactions were then obtained. The results of these runs are tabulated below as Table I.

Table I

| Conditions, Charge, etc. | Run 1 | Run 2 | Run 3 | Run 4 |
|---|---|---|---|---|
| Temperature | Reflux temperature of n-pentane approximately 36° C. | | | |
| Mercaptan used | tert-butyl | isopropyl | n-propyl | tert-octyl. |
| Mols mercaptan charged | 1 | 1 | 1 | 1. |
| Ml. n-pentane charged | 750 | 750 | 750 | 750. |
| Mols SCl$_2$ charged | 1 | 1 | 1 | 1. |
| RSSCl Compound | tert-butyl | isopropyl | n-propyl | tert-octyl. |
| Nitrogen compound used | morpholine | morpholine | morpholine | dimethylamine. |
| Mols nitrogen compound charged | 1 | 1 | 1 | 1. |
| Grams NaOH charged | 44 | 44 | 44 | 44. |
| Ml. of H$_2$O charged | 100 | 100 | 100 | 135. |
| Product obtained | N-tert-butyl-thiosulfenyl morpholine. | N-isopropyl-thiosulfenyl morpholine. | N-n-propyl-thiosulfenyl morpholine. | N-tert-octyl-thiosulfenyl dimethylamine. |
| Grams product obtained | 117.4 | 110.6 | 85.0 | 77.6. |
| Boiling point, ° C. | 78.5 at 0.35 mm | 73 at 0.3 mm | 84 at 0.4 mm | 105 at 0.15 mm. |
| Refractive Index (at 20° C.) | 1.5308 | 1.5325 | 1.5340 | |
| Percent yield | 58.3 | 53.2 | 44.1 | 35.1. |
| Analysis (Calculated) Percent: | | | | |
| C | 46.3 | 43.5 | | |
| H | 8.2 | 7.8 | | |
| N | 6.8 | 7.2 | 7.2 | 6.4. |
| S | 30.9 | 33.2 | 33.2 | 28.9. |
| O [1] | 7.8 | 8.3 | | |
| Analysis (found) Percent: | | | | |
| C | 47.5 | 44.9 | | |
| H | 8.7 | 8.3 | | |
| N | 6.3 | 6.3 | 7.5 | 6.8. |
| S | 31.9 | | 36.9 | 31.9. |
| O | 5.6 | | | |

[1] No oxygen is present in the reactants or products of run 4.

This example illustrates utilization of various mercaptan reactants to produce $RS_nX$ compounds in accordance with this invention, and conversion of resulting halide product without separation of same from the resulting halide-containing reaction mixture to derivatives of the said halide.

EXAMPLE III

Tert-butylthiosulfenyl chloride was prepared in the following manner in two separate runs. Sulfur dichloride was dissolved in n-pentane and tert-butyl mercaptan was added dropwise to the sulfur dichloride solution, maintained at about 36–49° C. The resulting solution was distilled through a packed column after the n-pentane was stripped off. The results of these runs are expressed below as Table II.

Table II

| Charge, conditions, etc. | Run 1 | Run 2 |
| --- | --- | --- |
| Reflux temp. of Mixture | Approx. 36° C | Approx. 49° C. |
| Ml. n-pentane charged | 2,100 | 150. |
| Grams $SCl_2$ charged | 340 | 340. |
| Grams mercaptan charged | 270 | 270. |
| Boiling range of product, °C | 54–60 at 10.5 mm | 55–65 at 10 mm. |
| Yield of tert-butylthiosulfenyl chloride product (grms.) | 231.5 | 385.0. |

This example illustrates that in the formation of halide product, in accordance with this invention, the amount of solvent employed can affect product yield. We have found that, when employing in excess of about 0.5 liter of solvent per mol of sulfur chloride reactant, yield of halide may be markedly impaired.

EXAMPLE IV

The tert-butylthiosulfenyl chloride prepared in run 1 of Example III was reacted with morpholine by the following procedure to produce N-tert-butylthiosulfenyl morpholine. Seventy grams of morpholine, 31 grams of sodium hydroxide, and 35 cc. of water were charged to a 2-liter, 3-necked flask fitted with a stirrer, a dropping funnel, and a dry ice-acetone condenser. 113.5 grams of tert-butylthiosulfenyl chloride dissolved in 550 grams of n-pentane was then added dropwise to the morpholine-caustic mixture. After the reaction had taken place, the phases were separated and the oil phase was washed with water. The washed oil phase was then stripped on a steam bath to remove the n-pentane and then distilled through a packed column. One hundred twenty-five grams of tert-butylthiosulfenyl morpholine was recovered, representing a yield of 83.4 percent.

This example illustrates direct reaction of a halide product, isolated from the reaction mixture in which it was formed, with morpholine to form a corresponding derivative of this invention.

EXAMPLE V

Tert-butylthiosulfenyl chloride was prepared by reacting di-tert-butyl trisulfide with sulfur dichloride in the following manner. One hundred three grams of sulfur dichloride was added in several portions to a flask containing 210 grams of di-tert-butyl trisulfide dissolved in 500 cc. of n-pentane. After the reaction appeared complete, the resulting solution was added dropwise to a flask containing two hundred ml. of water, 88 grams of sodium hydroxide, 174 grams of morpholine, and 200 ml. of n-pentane. This flask was fitted with a reflux condenser, as the reaction was very vigorous and large quantities of n-pentane were evaporated which had to be condensed and returned for further heat removal. After the reaction was complete, the phases were separated and the oil phase was water washed. The oil phase was then flashed in a simple fractionation step, resulting in the recovery of 319.4 grams of crude product which boiled in the range between 88° C. at 0.5 mm. and 111° C. at 0.25 mm. This crude product was then redistilled in a packed column. Final yield was 232.9 grams of product boiling (major portion) at 72° C. at 0.04 mm. This represented a 56 percent yield. The refractive index of the product at 20° C. was 1.5310.

This example illustrates formation of a halide, $RS_nX$, by reaction of a polysulfide with sulfur dichloride and reaction of resulting halide as a component of the reaction mixture in which it was formed, with a third compound, namely morpholine, to produce a derivative product of this invention.

Dithiosulfenyl dithiocarbamate derivative products of this invention exhibit especial utility as vulcanization accelerators for both natural and synthetic rubber. Dithiosulfenamide and thiosulfenamide derivatives of this invention exhibit utility as additives for mineral lubricating oils, particularly as antioxidants. Thiocarbonate derivative products of this invention exhibit utility as plant defoliants, for example, cotton defoliants. Thiosulfenyl and dithiosulfenyl xanthate products of this invention exhibit utility as plant defoliants, thiosulfenyl xanthates being disclosed as defoliating agents in copending application, Serial No. 373,682, of C.W. Osborn and L. D. Goodhue, filed August 11, 1953, now U.S. Patent No. 2,846,298. Thio- and dithiocyanate derivative products of this invention exhibit utility as pest control agents, e.g., insecticides and fungicides.

Reasonable variation and modification are possible within the scope of the foregoing disclosure and the appended claims to this invention, the essence of which is that (1) selected mercaptans and/or disulfides are reacted with inorganic sulfur halides to produce compounds, $RS_nX$, wherein $n$ is an integer equal to at least 1, and when a mercaptan is so reacted, maintaining mol ratio of mercaptan to sulfur halide reactants below 1:1 at all times; (2) $RS_nX$ compounds so produced are reacted as components of the reaction mixture in which formed, with compounds reactive with sulfenyl halides, as for example, ammonium or metal xanthates, primary or secondary amines, ammonium or metal dithiocarbamates, ammonium or metal trithiocarbonates and ammonium or metal cyanides, to form derivative products of this invention; and (3) $RS_nX$ compounds wherein $n$ is an integer of from 3 to 7, and derivatives thereof, as above described, are provided as new compounds; in the foregoing formulas, R being a radical of the group consisting of saturated acyclic, saturated alicyclic, and aryl, and containing preferably from 1–20 carbon atoms per molecule, and X being a halogen; all as described herein.

We claim:

1. A process comprising reacting a compound selected from the group consisting of a mercaptan, RSH, and a sulfide, $RS_mR$, with a sulfur halide, $S_yX_2$, to form a halide, $RS_nX$, and when reacting a mercaptan, maintaining a mol ratio of said mercaptan to said sulfur halide below 1:1, wherein, in the abovesaid formulas, each R is a radical containing from 1–20 carbon atoms selected from the group consisting of saturated acyclic, saturated alicyclic, and aryl, $m$ is an integer of from 1 to 6, $y$ is an integer of from 1 to 2, $n$ is an integer of 1 to 7, and X is a halogen selected from the group consisting of chlorine and bromine.

2. A process of claim 1 wherein resulting $RS_mX$-containing reaction mixture is then reacted with a compound reactive with said $RS_nX$, to form a corresponding derivative thereof.

3. A process of claim 2 wherein said reactive compound is selected from the group consisting of primary and secondary amines, and ammonium and metal xanthates, thiocarbonates, cyanides, dithiocarbamates, and ammonia.

4. A process of claim 1 wherein a mercaptan is reacted with said sulfur halide and is introduced into a body of said sulfur halide.

5. A process of claim 4 wherein introduction of mercaptan into said body of said sulfur halide is terminated when the mol ratio of mercaptan to sulfur halide is in the range of from about 0.5:1 to 0.9:1.

6. A process of claim 4 wherein said mercaptan is introduced into said body of sulfur halide at a rate of from about 300 to 600 mols per 100 mols of said sulfur halide per hour.

7. A process of claim 1 wherein reaction to form said halide product is conducted within a temperature range of from about −75 to 200° C.

8. A process of claim 1 wherein said mercaptan is selected from the group consisting of methyl mercaptan, isopropyl mercaptan, n-propyl mercaptan, tert-butyl mercatan, cyclohexyl mercaptan, tert-octyl mercaptan, 2,4,5-trimethylphenyl mercaptan, n-eicosyl mercaptan, 2,2-di-t-butyl-4-n-hexyl-cyclohexyl mercaptan, and tert-dodecyl mercaptan, and wherein said sulfide is selected from the group, consisting of dimethyl disulfide, di-tert-butyl trisulfide, dicyclohexyl tetrasulfide, cyclohexyl tert-butyl pentasulfide, n-eicosyl phenyl hexasulfide, n-propyl tert-dodecyl tetrasulfide, diethyl hexasulfide, and dihexyl monosulfide.

9. A process of claim 1 wherein said halogen is chlorine.

10. A process of claim 2 wherein said compound reactive with said $RS_nX$ is selected from the group consisting of sodium phenyl xanthate, potassium ethyl xanthate, methylamine, diethylamine, morpholine, piperidine, sodium diethyl dithiocarbamate, potassium dimethyl dithiocarbamate, sodium trithiocarbonate, lithium dithiocarbonate, and magnesium cyanide.

11. A process of claim 1 wherein said reacting is conducted in presence of a solvent chemically inert to reactants and product in the reaction zone.

12. A process of claim 11 wherein said solvent is selected from the group consisting of n-pentane, hexane, heptane, octane, nonane, benzene, toluene, carbon tetrachloride, diethyl ether, dioxane, and tetrachloroethane.

13. A process of claim 12 wherein up to about 0.5 liter of said solvent is employed per mol of sulfur halide reactant.

14. As a new compound, an organic halide characterized by the formula $RS_nX$ wherein R is a radical selected from the group consisting of saturated acyclic, saturated alicyclic, and aryl, X is a halogen selected from the group consisting of chlorine and bromine, and n is an integer of from 3 to 7.

15. A compound of claim 14 wherein said halogen is chlorine.

16. As a new compound, an organic halide characterized by the formula $RS_nX$ wherein R is a radical selected from the group consisting of saturated acyclic, saturated alicyclic, and aryl, X is a halogen selected from the group consisting of chlorine and bromine, and n is an integer of 3.

17. A compound of claim 16 wherein said halogen is chlorine.

18. Tertiary alkyl dithiosulfenyl chlorine as a new compound.

19. Tertiary butyldithiosulfenyl chloride as a new compound.

20. As a new compound, a derivative of a sulfenyl halide, characterized by the formula $(RS_n)_aY$ wherein R is a radical selected from the group consisting of saturated acyclic, saturated alicyclic and aryl, n is an integer of from 3 to 7, Y is a radical selected from the group consisting of xanthate, thiocarbonate, dithiocarbamate, amino, primary amino, secondary amino and cyano, and a is an integer selected from the group consisting of 1 and 2.

21. N,N-dimethyl-tert-butyldithiosulfenamide as a new compound.

References Cited in the file of this patent

UNITED STATES PATENTS 2,690,440     Himel et al. _____ Sept. 28, 1954

OTHER REFERENCES

Parkes: Mellor's Modern Inorganic Chemistry, p. 484 (1951).

UNITED STATES PATENT OFFICE
Certificate of Correction

Patent No. 2,886,593

May 12, 1959

Rector P. Louthan et al.

It is hereby certified that error appears in the printed specification of the above numbered patent requiring correction and that the said Letters Patent should read as corrected below.

Column 8, line 61, for "$RS_mX$" read —$RS_nX$—.

Signed and sealed this 19th day of January 1960.

[SEAL]

Attest:
KARL H. AXLINE,
*Attesting Officer.*

ROBERT C. WATSON,
*Commissioner of Patents.*